US011123159B2

(12) United States Patent
Owen (10) Patent No.: US 11,123,159 B2
(45) Date of Patent: Sep. 21, 2021

(54) ORTHODONTIC BRACKET IDENTIFICATION MARK (71) Applicant: Brandon Owen, Fort Collins, CO (US)

(72) Inventor: Brandon Owen, Fort Collins, CO (US)

(*) Notice: Subject to any disclaimer, the term of this patent is extended or adjusted under 35 U.S.C. 154(b) by 383 days.

(21) Appl. No.: 16/036,727

(22) Filed: Jul. 16, 2018

(65) Prior Publication Data
US 2020/0015938 A1 Jan. 16, 2020

(51) Int. Cl.
A61C 7/14 (2006.01)
A61C 7/16 (2006.01)

(52) U.S. Cl.
CPC ............. A61C 7/146 (2013.01); A61C 7/16 (2013.01); A61C 2201/002 (2013.01)

(58) Field of Classification Search
CPC .. A61C 7/14; A61C 7/16; A61C 7/146; A61C 2201/002
See application file for complete search history.

(56) References Cited

U.S. PATENT DOCUMENTS

| | | | |
|---|---|---|---|
| 3,250,003 A | | 5/1966 | Collito |
| 5,238,402 A * | | 8/1993 | Rohlcke et al. ......... A61C 7/12 |
| 5,254,002 A * | | 10/1993 | Reber et al. ............. A61C 7/14 |
| 5,263,859 A | | 11/1993 | Kesling |
| 5,692,896 A * | | 12/1997 | Pospisil ................... A61C 7/14 206/369 |
| 6,478,579 B1 * | | 11/2002 | Brusse ..................... A61C 7/12 433/10 |
| 7,175,428 B2 | | 2/2007 | Nicholson |
| 7,306,458 B1 | | 12/2007 | Lu |
| 9,883,924 B2 | | 2/2018 | Rudman |
| 2002/0150857 A1 * | | 10/2002 | Orikasa etal ............ A61C 7/00 |
| 2005/0244776 A1 * | | 11/2005 | Abels ...................... A61C 7/146 433/10 |
| 2006/0057533 A1 * | | 3/2006 | McGann ................. A61C 7/146 433/25 |
| 2006/0204918 A1 | | 9/2006 | Voudouris |
| 2008/0138756 A1 | | 6/2008 | Lim et al. |
| 2010/0129765 A1 * | | 5/2010 | Mohr ....................... A61C 7/12 433/10 |
| 2010/0279243 A1 * | | 11/2010 | Cinader et al. ......... A61C 7/146 |
| 2011/0189624 A1 * | | 8/2011 | Wong ....................... A61C 7/14 433/10 |
| 2014/0212827 A1 * | | 7/2014 | Tzou etal ............... A61C 7/146 |
| 2016/0199155 A1 | | 7/2016 | Bosio et al. |
| 2017/0105816 A1 * | | 4/2017 | Ward ..................... A61C 7/146 |
| 2017/0281317 A1 * | | 10/2017 | Bukhary et al. ........ A61C 7/146 |
| 2021/0128275 A1 * | | 5/2021 | Suh ........................ B33Y 50/02 |

OTHER PUBLICATIONS

PCT International Patent Application No. PCT/US2019/036165; International Search Report and Written Opinion of the International Searching Authority dated Aug. 23, 2019, 10 pages.

* cited by examiner

Primary Examiner — Matthew M Nelson
Assistant Examiner — Shannel Nicole Belk
(74) Attorney, Agent, or Firm — Craig R. Miles; CR Miles P.C.

(57) ABSTRACT

Orthodontic brackets and methods for the manufacture of orthodontic brackets including identification marks indicating placement, thickness, or torque.

8 Claims, 8 Drawing Sheets

ORTHODONTIC BRACKET IDENTIFICATION MARK

I. FIELD OF THE INVENTION

Orthodontic brackets and methods for the manufacture of orthodontic brackets including identification marks indicating placement, thickness, or torque.

II. BACKGROUND OF THE INVENTION

Orthodontic treatment involves movement of malpositioned teeth to desired locations in the oral cavity. One common type of orthodontic treatment involves the use of small, slotted orthodontic appliances known as brackets. The brackets are fixed to the patient's teeth and an archwire is placed in the slot of each bracket. The archwire forms a track to guide movement of the teeth to desired locations. The ends of orthodontic archwires are often connected to small orthodontic appliances known as buccal tubes that are, in turn, secured to the patient's molar teeth. In many instances, a set of brackets, buccal tubes and an archwire is provided for each of the patient's upper and lower dental arches. The brackets, buccal tubes and archwires are commonly and collectively referred to as "braces".

Orthodontic brackets that are adapted to be adhesively bonded to the patient's teeth can be placed and fixed to the teeth using either one of two techniques known as direct bonding and indirect bonding. Direct bonding techniques generally involve the serial placement of individual adhesive-coated orthodontic brackets onto a patient's tooth surface by an orthodontist. Orthodontic brackets can be manufactured with a layer or coating of orthodontic adhesive on the base of each bracket. Typically, one bracket at a time is placed onto a patient's tooth surface until all of the brackets required for treatment are placed on the teeth. Alternatively, a layer or coating of orthodontic adhesive can be applied to the base of each bracket by the orthodontist immediately before the bracket is placed onto a tooth surface. In direct orthodontic bonding, the layer or coating of orthodontic adhesive on the orthodontic appliance is not hardened until after the orthodontic appliance is placed on a tooth surface. The layer or coating of orthodontic adhesive does not have a contour that is a negative replica of the tooth surface until the adhesive has been placed in contact with the tooth surface. Direct bonding techniques have been used to place and fix a single orthodontic bracket or serially fix a plurality of orthodontic brackets in a patient's oral cavity.

Indirect bonding techniques generally involve the use of a placement device or transfer apparatus having a shape that matches the configuration of at least part of the patient's dental arch. One type of placement device includes a "bonding tray" and typically has a cavity for receiving a plurality of teeth simultaneously. A set of orthodontic brackets may be releasably connected to the bonding tray at certain, predetermined locations. When the tray connected to the orthodontic appliances is placed over the matching portions of the patient's dental arch, each orthodontic appliance can be positioned on the patient's teeth.

In particular conventional indirect bonding techniques, before the bonding tray is formed, the brackets may be fixed to a plurality of teeth of a replica model of the patient's dental arch. Typically, an orthodontic adhesive is applied to the orthodontic brackets, the brackets are pressed onto the replica teeth, and the orthodontic adhesive can cure to a fully hardened condition which may involve use of an orthodontic curing light. This fully hardened orthodontic adhesive may remain on the orthodontic brackets when it is removed from the replica teeth and can serve as a "custom base" for bonding the brackets to the patient's teeth.

Methods of making indirect bonding trays by taking a negative impression of each of the patient's dental arches and then making a replica model from each negative impression have been largely replaced by three-dimensional scanning or imaging using optical technologies such as: confocal laser microscopy, active wavefront sampling, accordion fringe inferometry, and optical coherent tomography. This may be followed by the use of three-dimensional printing technologies to produce a replica model of the patient's dental arches, such as: fused deposition modeling and printing, selective laser melting or sintering, electron beam melting, or inkjet three-dimensional printing. The brackets may then be temporarily bonded to the three dimensionally printed replica model of the patient's dental arches.

Regardless of the method employed to produce the bonding tray, conventional identification marks disposed on the labial surfaces of the brackets to identify correct placement of each of the brackets on the corresponding teeth in the upper or lower dental arch can be visually obscured when positioned in conventional bonding trays. Accordingly, the identification marks cannot be visualized to confirm that the brackets are properly arranged in the bonding tray for proper placement of the brackets on the teeth of the dental arch.

Accordingly, there would an advantage in a bracket identification system in which bracket identification marks are disposed on the brackets which allows the bracket identification marks to be readily visualized and which are not obscured by the matrix material of the bonding tray.

III. SUMMARY OF THE INVENTION

Accordingly, a broad object of the present invention can be to provide a bracket having one or more bracket identification marks disposed on one or more of the gingival surfaces of the bracket base, the bracket body extending from the bracket base, or the pair of spaced apart tie wings coupled to the bracket body which affords the substantial advantage of ready visualization of the identification marks of brackets held in a bonding tray.

Another broad object of the present invention can be to provide a bracket identification system including one or more of a bracket including a bracket base adapted to attach to a tooth, a bracket body extending from the bracket base, and a pair of spaced apart tie wings extending from the bracket body, a bracket bonding tray including at least one bracket retaining feature which retains the bracket to visually expose the gingival surfaces of the bracket and one or more bracket identification marks disposed on one or more of the exposed gingival surfaces of the brackets held in the bonding tray.

Another broad object of the present invention can be to provide a method of making a bracket identification system including one or more of: disposing one or more bracket identification marks on the gingival surfaces of a plurality of brackets to identify incremental differences in one or more bracket characteristics, configuring a bracket bonding tray including at least one bracket retaining feature which retains the bracket in the bonding tray to visually expose one or more gingival surfaces of the bracket to allow ready visualization of the bracket identification marks.

Another broad object of the present invention can be to provide a method for using a bracket identification system including obtaining a bonding tray to receive one or more brackets, selecting one or more brackets based on bracket identification marks disposed on the gingival surfaces of each bracket, matingly engaging the one or more brackets in the bonding tray according to the corresponding bracket identification marks, and visualizing the bracket identification marks disposed on the gingival surfaces of the bracket being held in the bonding tray to ascertain each bracket has the correct position in the bonding tray.

Naturally, further objects of the invention are disclosed throughout other areas of the specification, drawings, photographs, and claims.

V. DETAILED DESCRIPTION OF THE INVENTION

Generally, referring to FIGS. 1 through 14, embodiments of a bracket identification system (1) include brackets (2) having one or more identification marks (3) located on the bracket (2) to permit viewing upon positioning the brackets (2) in a bracket bonding tray (4). Each of the brackets (2) can include a bracket base (5), a bracket body (6), a pair of tie wings (8) and optionally a bracket retention anchor (7). The bracket base (5) can have a first surface (9) and a second surface (10) joined at a peripheral edge (11). The bracket base (5) can be adapted to attach to a tooth (12) in a dental arch (13). The bracket body (6) can have a bracket body first end (14) secured to the second surface (10) of the bracket base (5) and a bracket body second end (15). The bracket retention anchor (7) can be disposed on the bracket body surface (16) between the bracket body first end (14) and the bracket body second end (15). The bracket retention anchor (7) can be configured to assist in anchoring the bracket (2) to a bonding tray (4). For purposes of this invention, the term "anchoring" means holding a bracket (2) in a substantially fixed position in a bonding tray (4) in response to forces exerted on the bracket (2) during normal production or use of the bonding tray (4). Projecting outwardly from the bracket body (6) can be a pair of tie wings (8). Each of the pair of tie wings (8) can have a tie wing face (17). The tie wing face (17) can be joined to the bracket body (6) by a gingival edge (18), incisal edge (19), medial edge (20), and distal edge (21). Upon securing the bracket to the corresponding tooth (12) in the dental arch (13) the gingival edge (18) of the tie wing faces the gums (22) of the dental arch (13), the incisal edge (19) of the tie wing (8) faces away from the gums of the dental arch (13), the medial edge (20) of the tie wing (8) faces the anterior midline (23) of the dental arch (13), and the distal edge (21) of the tie wing (8) faces away from the anterior midline (23) of the dental arch (13). The bracket (2) can be made from any one or more of a variety of rigid materials, such as: a metal, a plastic, a ceramic, or other like rigid material.

Now referring primarily to FIGS. 3 through 14, each bracket (2) can include one or more identification marks (3). Each identification mark (3) can be located on the bracket (2) to permit viewing of the identification mark (3) upon placement or anchoring of the bracket (2) in a bonding tray (4). The identification mark (3) can include one or more sensorial perceivable indicia (24) disposed on one or more gingival surfaces of the bracket (2). The sensorial perceivable indicia (24) can identify a bracket characteristic (25) which varies based on one or more of tooth placement (26) with reference to a specific tooth (12) in the upper or lower dental arch (13) (as shown in the illustrative example of FIG. 2), a bracket body height (27)(also referred to as "thickness") with reference to the distance between the bracket base first surface (9) and the bracket body second end (15)(as shown in the illustrative example of FIG. 3), or angulation (28) of the bracket base (5) in relation to the bracket body (6)(or angulation of the archwire slot)(as shown in the illustrative example of FIG. 3), or other bracket characteristic (25) identifiable to properly place the bracket (2) in the dental arch (13) or identify a structure of the bracket (2) which varies based on forces to be applied by the bracket (2) to a corresponding tooth (12) to generate corrective movement of the tooth (12).

The sensorial perceivable indicia (24) can be any feature which can be disposed on the surface of a bracket (2) which can be incrementally varied to correlate with incremental variance in a particular bracket characteristic (25). In particular embodiments, the sensorial perceivable indicia (24) can be an incremented range of: color (hue or shade), texture, light reflectance, light emission, or combinations thereof, which can be disposed on the gingival surface of a bracket (2). In the illustrative examples of FIGS. 1 through 12, a colored deposit (29) can be varied by one or both of hue (referring to a color such as red, yellow, blue) or shade (referring to color lightness or darkness). However, the illustrative example of a colored deposit (29) is not intended to be limiting with respect to other sensorial perceivable indicia (24), such as tactile or visible texture, which incrementally vary over the entirety or part of the area covered by the sensorial perceivable indicia (24).

The identification mark (3) can have an identification mark perimeter (30) which bounds an area of any configuration of the identification mark (3) which can be disposed within the gingival margin (31) of a first or second tie wing (8A)(8B) of the pair of tie wings (8). In other particular embodiments, the identification mark (3) can be located on the bracket body (6) between the gingival edge (18) of a first or second tie wing (8A)(8B) of the pair of tie wings (8), and the bracket base (5). In further particular embodiments, the identification mark (3) can be located on the gingival facing portion of the bracket base (5).

While the illustrative examples correlate a particular bracket characteristic (25) with a particular placement of an identification mark (3) on a particular portion of gingival surfaces (32) of a bracket (2); this is not intended to preclude any objective correlation system between a bracket characteristic (25) and placement of the identification mark (3) at a particular location on the gingival surfaces (32) of the bracket (2).

Figure 3:
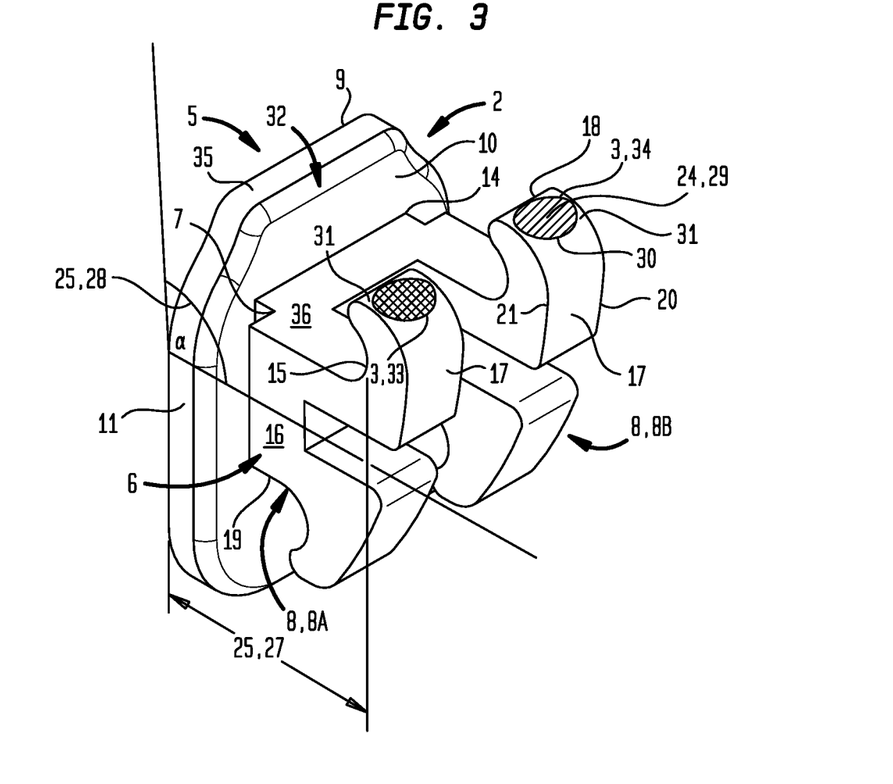
FIG. 3 is a perspective view of a particular embodiment of a bracket including bracket identification marks.
Figure 4:
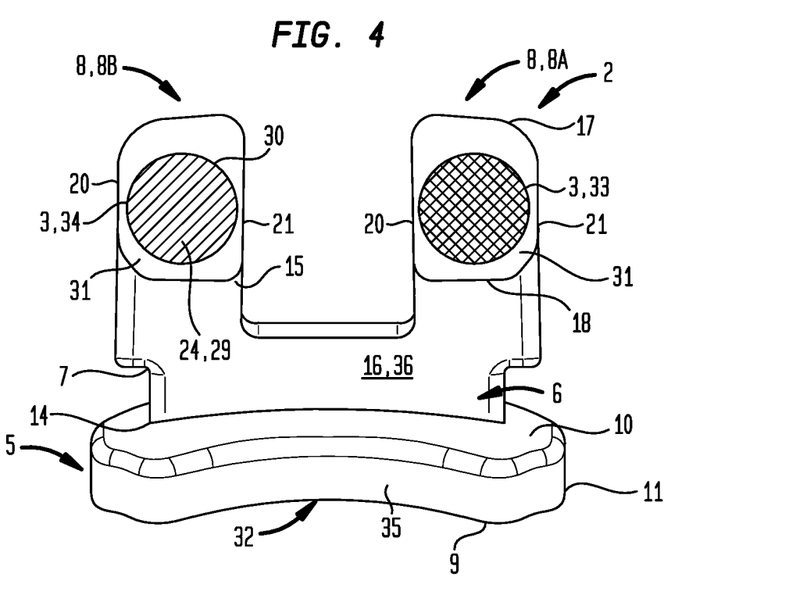
FIG. 4 is a top plan view of a particular embodiment of a bracket including bracket identification marks.
Figure 5:
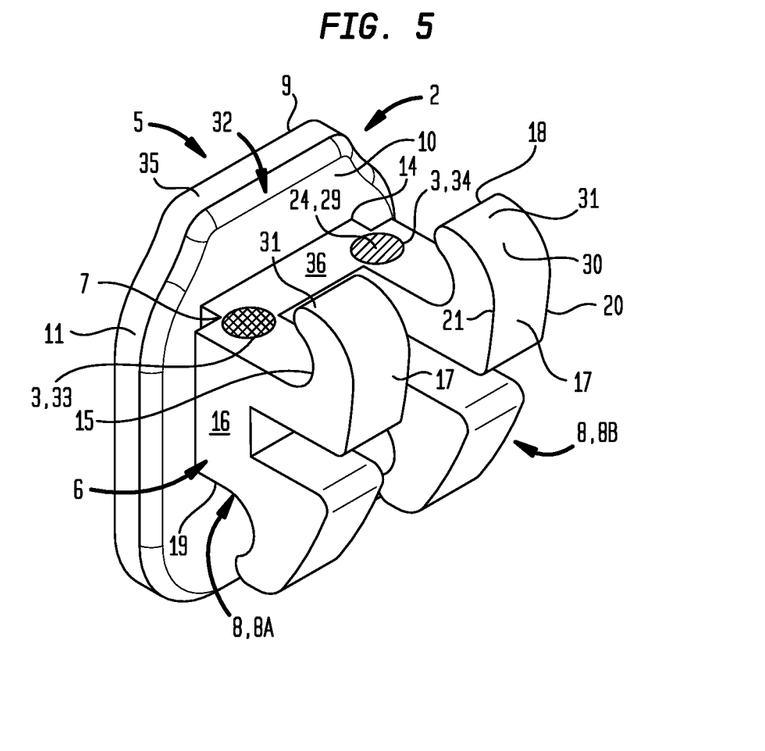
FIG. 5 is a perspective view of a particular embodiment of a bracket including bracket identification marks.
Figure 6:
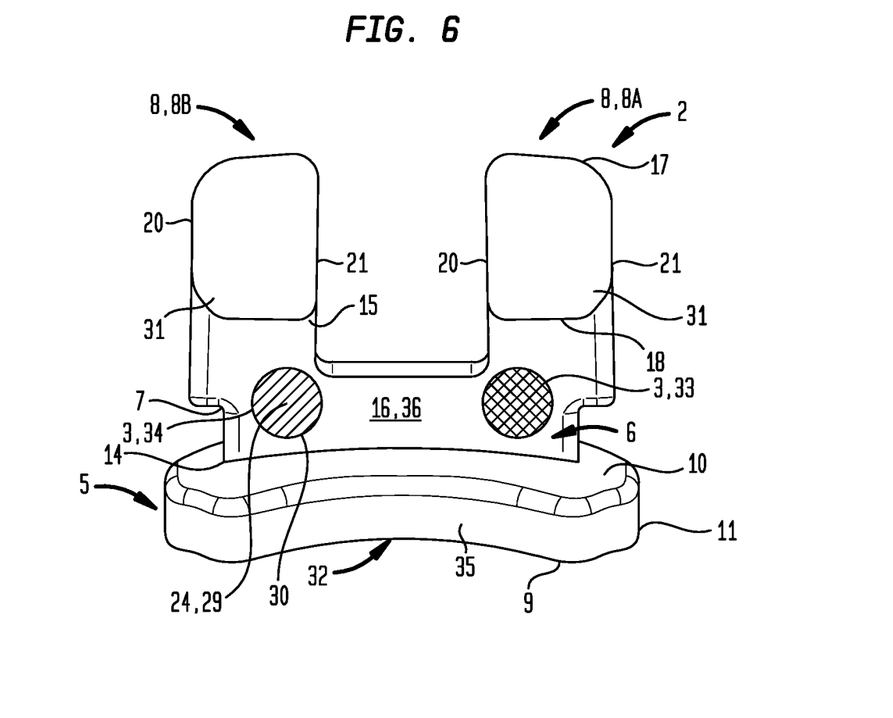
FIG. 6 is a top plan view of a particular embodiment of a bracket including bracket identification marks.
Figure 7:
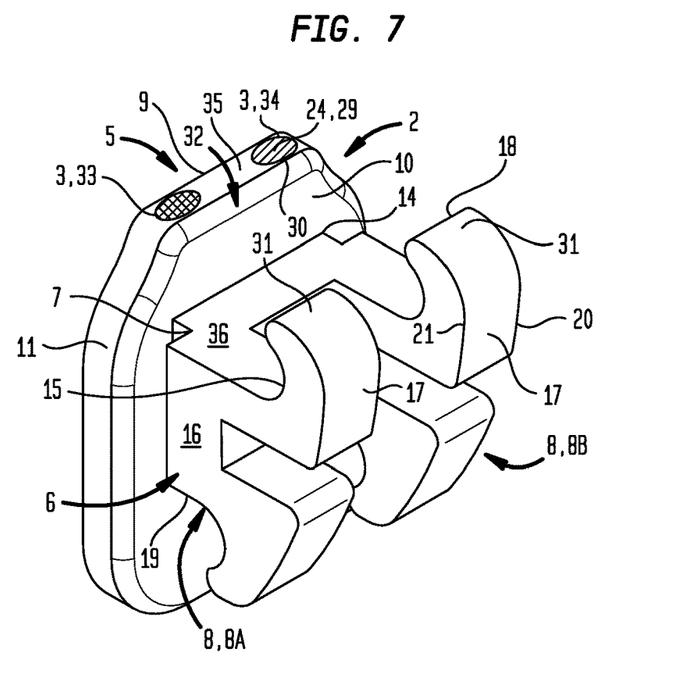
FIG. 7 is a perspective view of a particular embodiment of a bracket including bracket identification marks.
Figure 8:
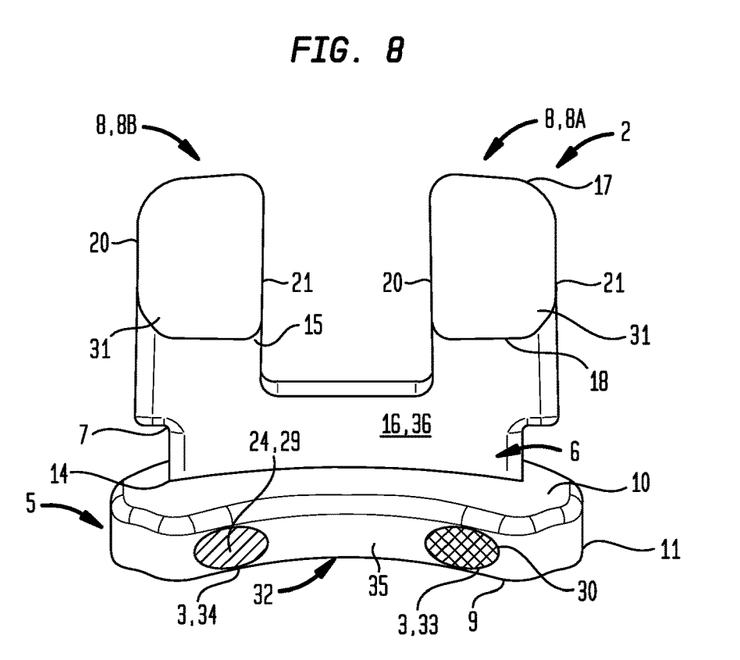
FIG. 8 is a top plan view of a particular embodiment of a bracket including bracket identification marks.

Now referring primarily to FIGS. 3 and 4, in particular embodiments, a first identification mark (33) can incrementally vary to incrementally identify one of bracket body height (27) between the bracket base first surface (9) and the bracket body second end (15) or angulation (28) of the bracket base (5) in relation to the bracket body (6). As an illustrative example, the first identification mark (33) can be disposed on the gingival margin (31) of the tie wing face (17) of the first or second tie wing (8A)(8B) of the pair of tie wings (8) to identify bracket body height (27).

Again, referring primarily to FIGS. 3 and 4, the second identification mark (34) can incrementally vary to incrementally identify one of bracket body height (27) between the bracket base first surface (9) and the bracket body second end (15) or angulation (28) of the bracket base (5) in relation to the bracket body (6). As an illustrative example, the second identification mark (34) can be located on the gingival margin (31) of the tie wing face (17) of the second tie wing (8B) of the pair of tie wings (8) to identify angulation (28) of the bracket base (5) in relation to the bracket body (6). In particular embodiments, the second identification mark (34) can be disposed adjacent the first identification mark (33) located on the gingival margin (31) of the tie wing face (17) of the first tie wing (8A) of the pair of tie wings (8).

Now referring primarily to FIGS. 5 and 6 and FIGS. 7 and 8, the first and second identification marks (33)(34) respectively incrementally identifying bracket body height (27) between the bracket base first surface (9) and the bracket body second end (15) or angulation (28) of the bracket base (5) in relation to the bracket body (6) can be disposed on the gingival surface (32) of the bracket body (6) or the gingival peripheral edge (35) of the bracket base (5).

Figure 9:
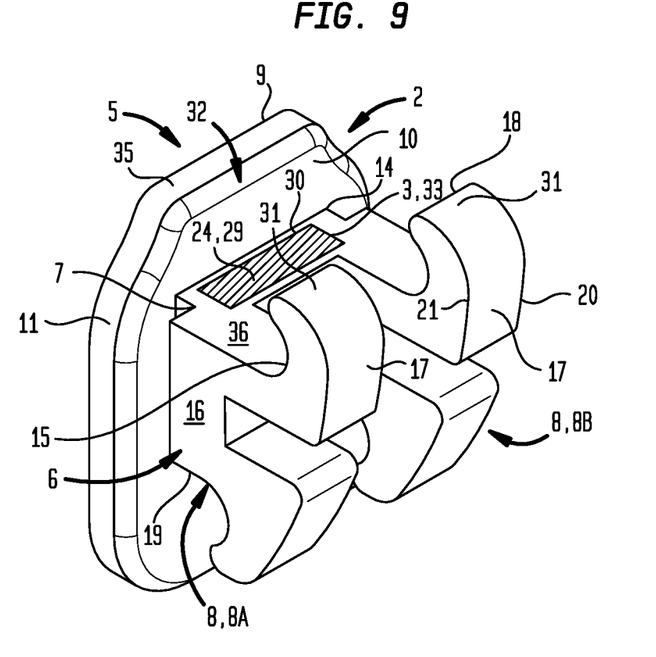
FIG. 9 is a perspective view of a particular embodiment of a bracket including bracket identification marks.
Figure 10:
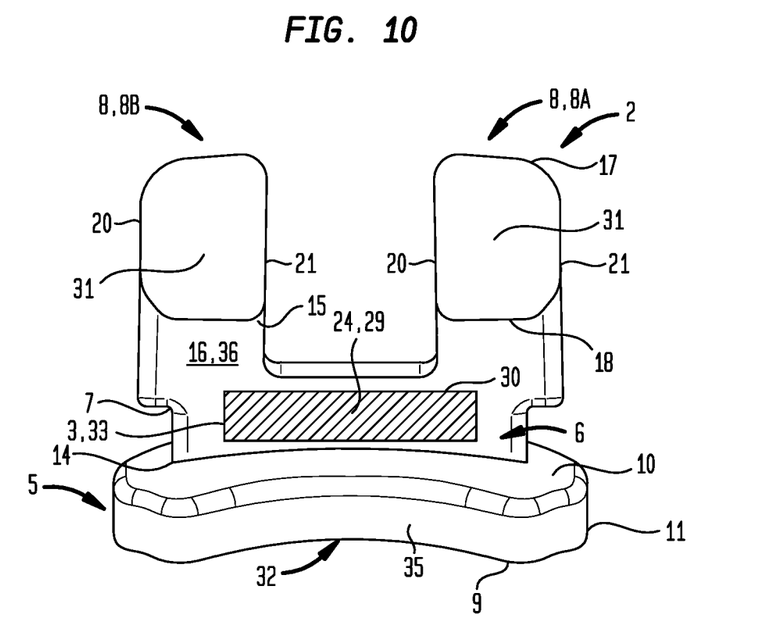
FIG. 10 is a top plan view of a particular embodiment of a bracket including bracket identification marks.

Now referring primarily to FIGS. 9 and 10, in particular embodiments, an identification mark (3) which incrementally varies to correspondingly incrementally identify a bracket characteristic (25) can be disposed on the gingival surface (36) of the bracket body (6). As one illustrative example, the identification mark (3) can incrementally vary to incrementally identify tooth placement (26) of each of a plurality of brackets (2) with a corresponding plurality of teeth (12) of either a lower dental arch (13) or an upper dental arch (13)(as shown in the illustrative example of FIG. 2).

Figure 11:
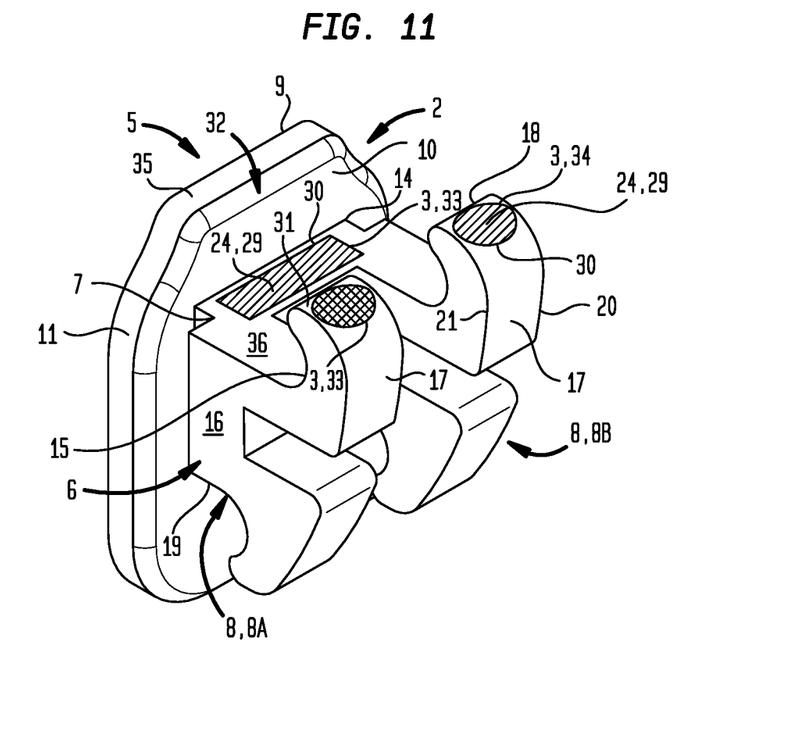
FIG. 11 is a perspective view of a particular embodiment of a bracket including bracket identification marks.
Figure 12:
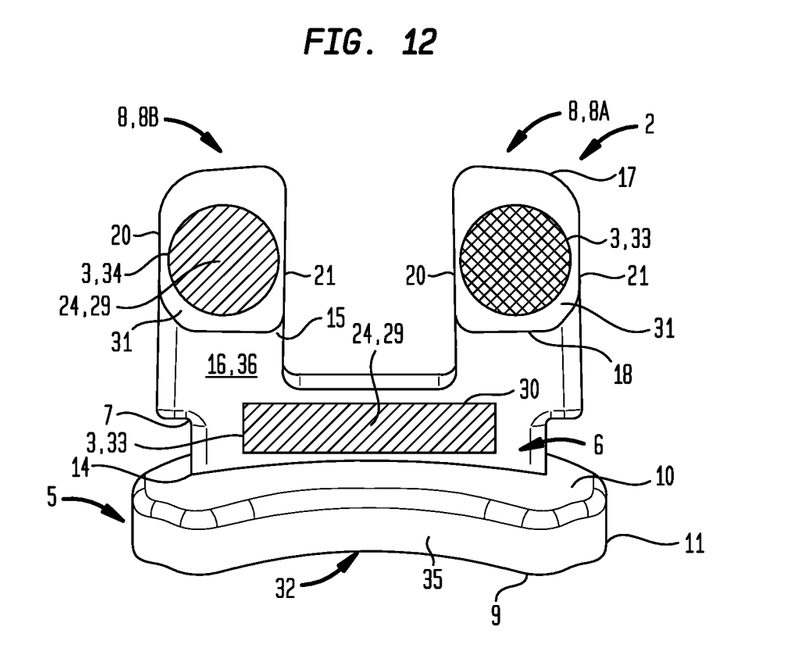
FIG. 12 is a top plan view of a particular embodiment of a bracket including bracket identification marks.

Now referring primarily to FIGS. 11 and 12, in particular embodiments, a first identification mark (33) can be disposed on the gingival margin (31) of the tie wing face (17) of r the first tie wing (8A) of the pair of tie wings (8). A second identification mark (34) can be disposed on the gingival margin (31) of the tie wing face (17) of the second tie wing (8B) of the pair of tie wings (8). A third identification mark (37) can be disposed on the bracket body (6) between the gingival edge (18) of the tie wing face (17) of either of the first or second tie wing (8A)(8B) of the pair of tie wings (8) and the bracket base (5), each respectively incrementally varying to correspondingly incrementally identify a range of differences in a bracket characteristic (25).

In the illustrative example of FIGS. 11 and 12, the first identification mark (33) identifies the body height (27) of the bracket (2), the second identification mark (34) identifies the angulation (28) of the bracket base (5) relative to the bracket body (6) and the third identification mark (37) identifies tooth placement (26) of each of a plurality of brackets (2) with a corresponding plurality of teeth (12) of either a lower dental arch (13) or an upper dental arch (13).

Figure 13:
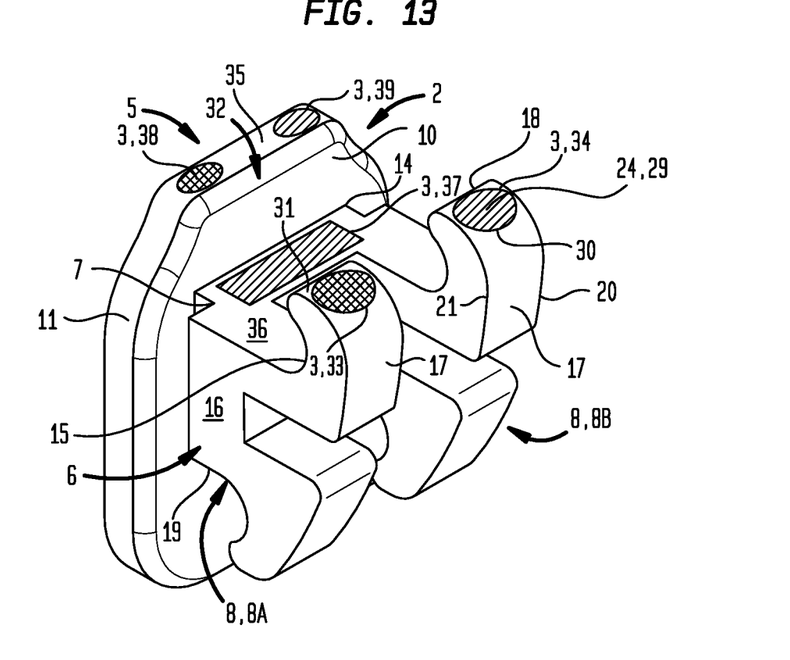
FIG. 13 is a perspective view of a particular embodiment of a bracket including bracket identification marks.
Figure 14:
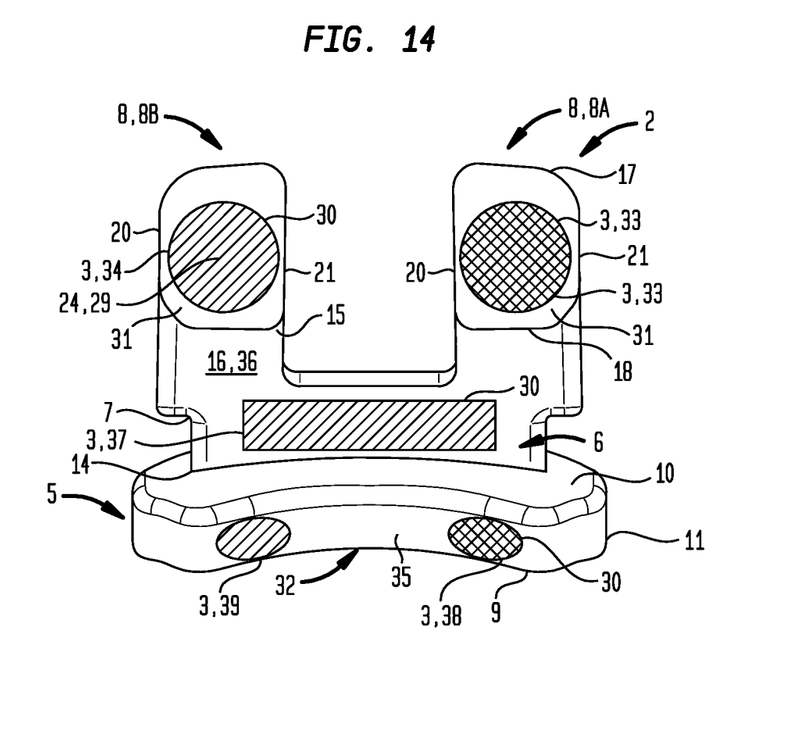
FIG. 14 is a top plan view of a particular embodiment of a bracket including bracket identification marks.

Now, referring primarily to FIGS. 13 and 14, in particular embodiments, a fourth or fifth identification mark (38)(39) can be disposed on the gingival peripheral edge (35) of the bracket base (5) to correspondingly incrementally identify a range of differences in fourth and fifth bracket characteristics (25).

Figure 1:
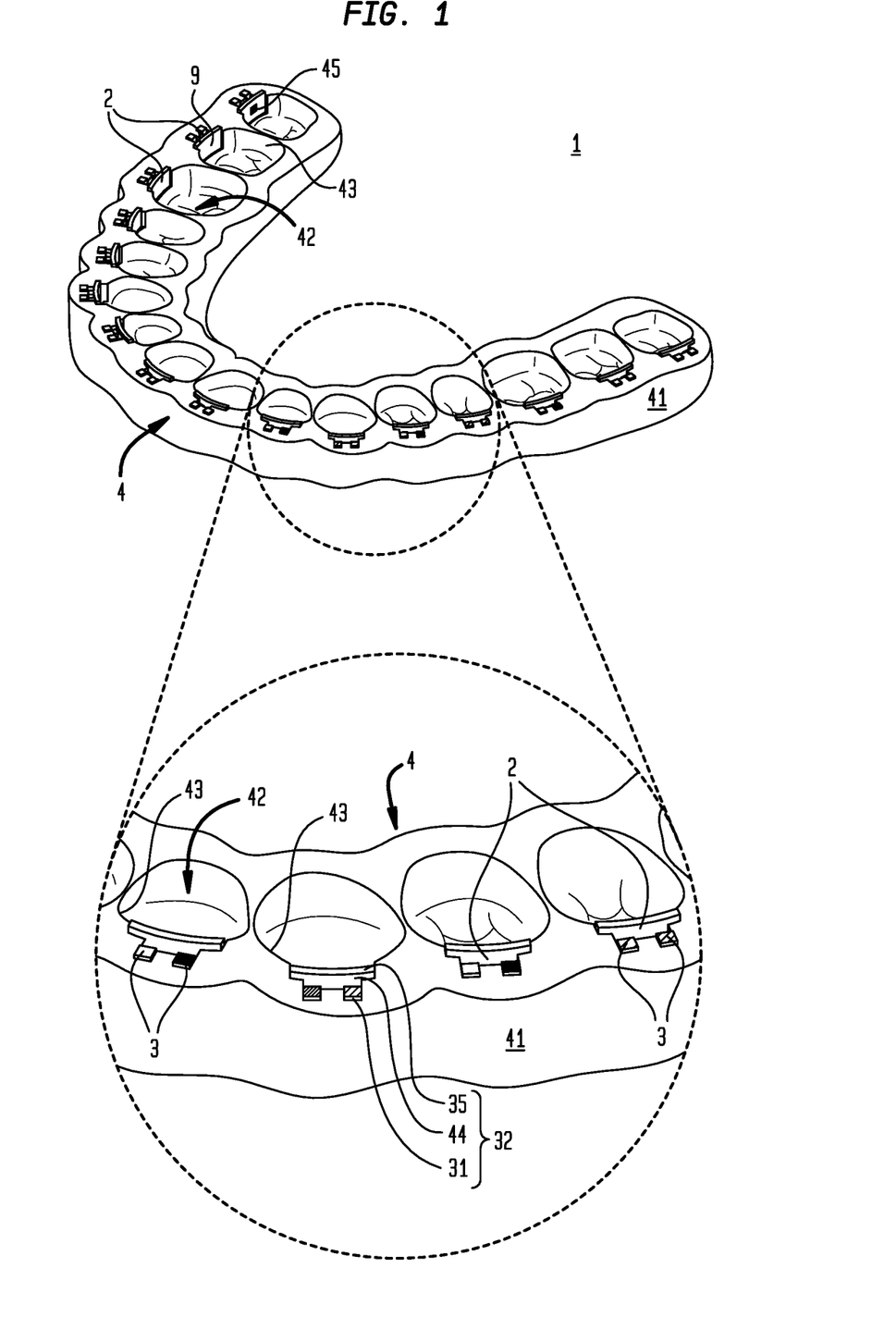
FIG. 1 is a perspective view of a particular embodiment of a bracket identification system including an enlarged perspective view of brackets including a particular embodiment of the inventive bracket identification marks.
Figure 2:
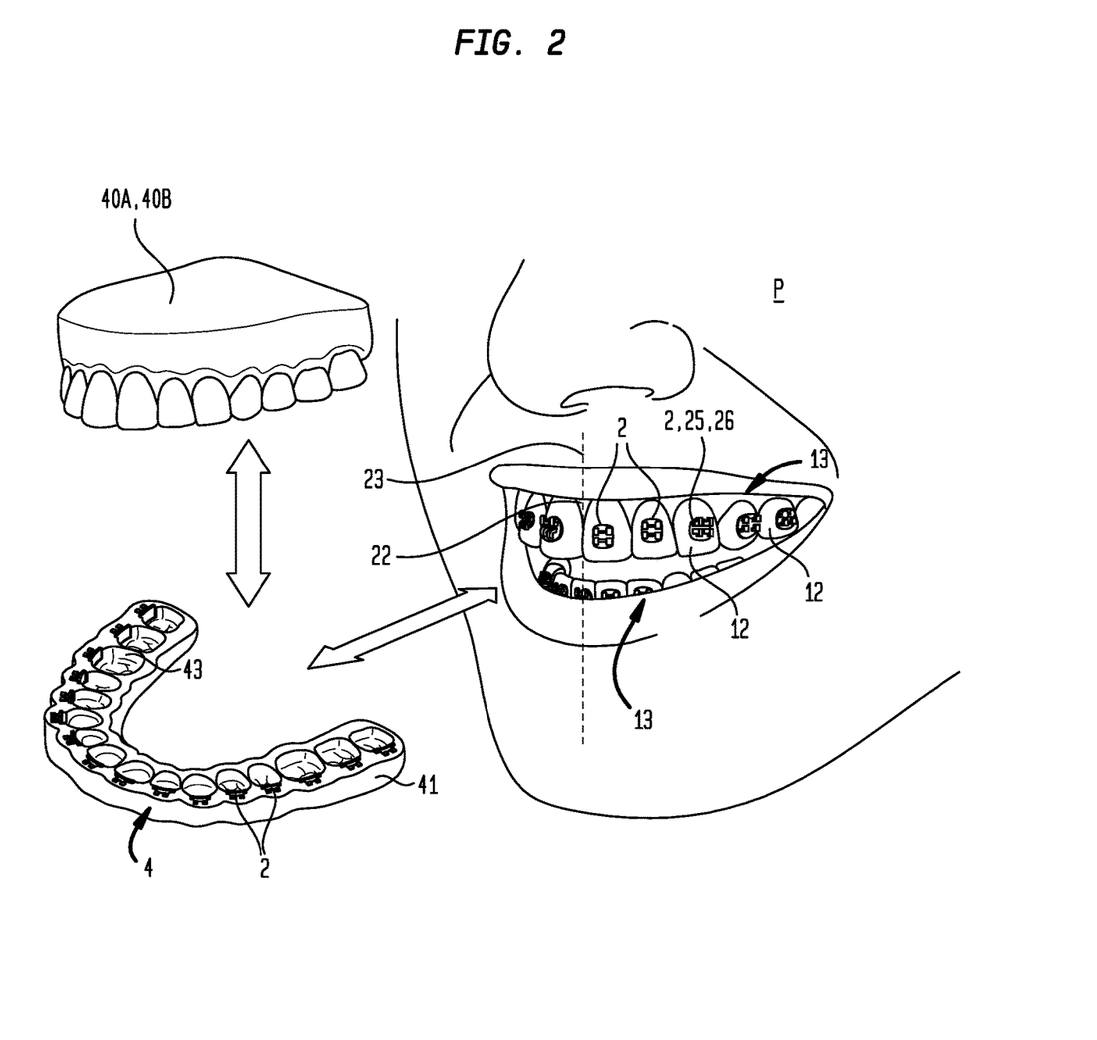
FIG. 2 is a perspective view of a particular method of using a bracket identification system to dispose brackets on a patient's dental arch and removal of the bonding tray from the brackets.

Again, referring primarily to FIGS. 1 through 2, in particular embodiments, a bonding tray (4) can be generated by obtaining a replica model (40A) of a plurality of teeth (12) of a dental arch (13) of a patient (P) (as shown in the illustrative example of FIG. 2). A plurality of brackets (2) having one or more identification marks (3) disposed on the gingival surfaces (32), as described above, can be releasably bonded at locations on the replica model (40A) of the plurality of teeth (12) of the dental arch (13). A matrix material (41) can be applied to the plurality of brackets (2), releasing the plurality of brackets (2) from the replica model (40A) of the plurality of teeth (12) of the dental arch (13) and removing the matrix material (41) from the replica model (40) of the dental arch (13). In applying the matrix material (41) to the plurality of brackets (2) releasably bonded to the replica model (40A) of the plurality of teeth (12) in the dental arch (13) the gingival peripheral edge (35) of the bracket base (5) and the gingival margins (31) of the first and second tie wings (8A)(8B) of the pair of tie wings (8) can remain visible. The matrix material (41) can further be curable to establish a connection between the matrix material (41) and the bracket. The connection between the matrix material (41) and the bracket (2) can maintain the position of each of the plurality of brackets (2) in the matrix material (41).

Again, referring primarily to FIGS. 1 and 2, in particular embodiments, a bonding tray (4) can include a plurality of brackets (2) each including one or more of a bracket base (5), a bracket body (6) secured to the bracket base (5), a pair of tie wings (8A)(8B) coupled to the bracket base (5), and one or more identification marks (3) disposed on the gingival surfaces (32) of the brackets (2), as described above. A virtual replica model (40B) of the dental arch (13) of the patient (P) may be generated by three-dimensional scanning or imaging data of the patient's (P) dental arch (13). One or a plurality of brackets (2) can be virtually positioned in correct orientations relative to the virtual replica model (40B). An indirect bonding tray (4) can then be produced by three-dimensional printing (or other three-dimensional forming or fabrication process) using one or more matrix materials (41). The printed, formed or fabricated indirect bonding tray (4) can include one or a plurality of cavities (42) having cavity walls (43) configured to correspondingly receive one or more of brackets (2). In particular embodiments, each of the one or plurality of cavities (42) can have cavity walls (43) configured to correspondingly matingly engage the bracket retention anchor (7) of the bracket body (6). The matrix material (41) of the bonding tray (4) proximate the plurality of cavities (42) can further permit one or more of: the gingival peripheral edge (35) of the bracket base (5), the gingival surface of the bracket base (44), or the gingival margin (31) of the first or second tie wings (8A) (8B) of the pair of tie wings (8) to be visually exposed. Mated engagement of the cavity walls (43) with the brackets (2) can retain the one or the plurality of brackets (2) in the bonding tray (4) at the locations or in the orientations corresponding to the locations or orientations on the teeth (12) of the patient (P) when the bonding tray (4) is used to transfer and fixedly seat the one or plurality of brackets (2) to the teeth (12) of the patient (P). The bracket identification marks (3) disposed on the gingival surfaces (32) of the brackets (2) retained in the bonding tray (4) can be used to visually identify the corresponding bracket characteristics (25) of each bracket (2) to assure that each bracket (2) has the correct location in the bonding tray (4).

Again referring primarily to FIGS. 1 and 2, particular embodiments can further include applying a bonding material (45) to the first surface (9) of the bracket base (5) of each of the plurality of brackets (2) retained in the matrix material (41), positioning the bonding tray (4) (which retains the one or plurality of brackets (2)) to the plurality of teeth (12) of the dental arch (13), and concurrently seating the plurality of brackets (2) to the plurality of teeth (12) in the dental arch (13). The seating of the plurality of brackets (2) to the plurality of teeth (12) in the dental arch (13) can substantially correspond to the locations at which the plurality of brackets (2) were releasably bonded on the replica model (40A) or virtually positioned in the virtual replica model (40B). The precise location or orientation of the brackets (2) in the matrix material (41) can be maintained based on the connection or mated engagement between the matrix material (41), and each of the bracket retention anchors (7) disposed on the plurality of brackets (2).

As can be easily understood from the foregoing, the basic concepts of the present invention may be embodied in a variety of ways. The invention involves numerous and varied embodiments of a bracket system and methods for making and using such bracket system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "anchor" should be understood to encompass disclosure of the act of "anchoring"—whether explicitly discussed or not—and, conversely, were there effectively disclosure of the act of "anchoring", such a disclosure should be understood to encompass disclosure of an "anchor" and even a "means for anchoring." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the brackets herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A bracket identification system, comprising:
   a bracket including:
   a bracket base adapted to attach to a tooth in a dental arch;
   a bracket body extending from said base; and
   a pair of spaced apart tie wings extending from said bracket body, each of said pair of tie wings having a tie wing face;
   a bracket bonding tray configured to retain said bracket to visually expose one or more of a gingival margin of said pair of tie wing faces, a gingival side of said bracket body, or a gingival side of said bracket base;
   a first identification mark disposed on one of said gingival margin of said pair of tie wing faces, said gingival side of said bracket body, or said gingival side of said bracket base;
   a second identification mark disposed on said gingival margin of said pair of tie wing faces, said gingival side of said bracket body, or said gingival side of said bracket base;
   a third identification mark disposed on one of said gingival edge of said pair of tie wing faces, said gingival side of said bracket body, or said gingival side of said bracket base;
   wherein said second identification mark identifies a bracket body height of said bracket; and said third identification mark identifies angulation of said bracket body in relation to said bracket base.

2. A bracket identification system, comprising:
   a bracket including:
   a bracket base adapted to attach to a tooth in a dental arch;
   a bracket body extending from said base; and
   a pair of spaced apart tie wings extending from said bracket body, each of said pair of tie wings having a tie wing face;
   a bracket bonding tray configured to retain said bracket to visually expose one or more of a gingival margin of said pair of tie wing faces, a gingival side of said bracket body, or a gingival side of said bracket base;
   a first identification mark disposed on one of said gingival margin of said pair of tie wing faces, said gingival side of said bracket body, or said gingival side of said bracket base;
   a second identification mark disposed on said gingival margin of said pair of tie wing faces, said gingival side of a bracket body, or said gingival side of said bracket base;
   a third identification mark disposed on one of said gingival margin of a pair of tie wing faces, said gingival side of said bracket body, or said gingival side of said bracket base;
   wherein said first identification mark identifies placement of said bracket on a tooth in an upper dental arch or a tooth in said lower dental arch;
   said second identification mark identifies angulation of said bracket body in relation to said bracket base; and
   said third identification mark identifies bracket body height.

3. A method, comprising:
   configuring a bracket including:
   a bracket base adapted to attach to a tooth in a dental arch;
   a bracket body extending from said base; and
   a pair of spaced apart tie wings extending from said bracket body,
   each of said pair of tie wings having a tie wing face;
   forming a bracket bonding tray including at least one bracket retaining feature which retains said bracket to visually expose one or more of a gingival margin of said pair of tie wing faces, a gingival side of said bracket body, or a gingival side of said bracket base;
   disposing a first identification mark on one of said gingival margin of said pair of tie wing faces, said gingival side of said bracket body, or said gingival side of said bracket base;
   disposing a second identification mark on one of said gingival edge of said pair of tie wing faces, said gingival side of said bracket body, or said gingival side of said bracket base;
   disposing a third identification mark on one of said gingival edge of said pair of tie wing faces, said gingival side of said bracket body, or said gingival side of said bracket base;
   wherein said first identification mark identifies placement of said bracket on a tooth in an upper dental arch or a tooth in said lower dental arch; and
   said second identification mark identifies bracket height of said bracket;
   said third identification mark identifies angulation of said bracket body in relation to said bracket base.

4. A method, comprising:
   configuring a bracket including:
   a bracket base adapted to attach to a tooth in a dental arch;
   a bracket body extending from said base; and
   a pair of spaced apart tie wings extending from said bracket body, each of said pair of tie wings having a tie wing face;

forming a bracket bonding tray including at least one bracket retaining feature which retains said bracket to visually expose one or more of a gingival margin of said pair of tie wing faces, a gingival side of said bracket body, or a gingival side of said bracket base;

disposing a first identification mark on one of said a gingival margin of said pair of tie wing faces, a said gingival side of said bracket body, or a said gingival side of said bracket base;

disposing a second identification mark on one of said gingival edge of said pair of tie wing faces, said gingival side of said bracket body, or said gingival side of said bracket base;

disposing a third identification mark on one of said gingival edge of said pair of tie wing faces, said gingival side of said bracket body, or said gingival side of said bracket base;

wherein said first identification mark identifies placement of said bracket on a tooth in an upper dental arch or a tooth in said lower dental arch; and said third identification mark identifies bracket height of said bracket.

5. A method, comprising:

configuring a bonding tray to receive one or more brackets, each of said one or more brackets including one or more identification marks disposed on one or more a gingival margin of a pair of tie wing faces, a gingival side of a bracket body, or a gingival side of a bracket base;

selecting said one or more brackets for receipt in said bonding tray;

engaging said one or more brackets to said bonding tray, said one or more identification marks remaining visually exposed in said bonding tray; wherein said one or more identification marks comprises a first identification mark identifying placement of said bracket on a tooth in an upper dental arch or a tooth in said lower dental arch;

said one or more identification mark comprises a second identification mark, said second identification mark identifying bracket height of said bracket; and said one or more identification marks comprises a third identification mark, said third identification mark identifying angulation of said bracket body in relation to said bracket base.

6. A method, comprising:

configuring a bonding tray to receive one or more brackets, each of said one or more brackets including one or more identification marks disposed on one or more a gingival margin of a pair of tie wing faces, a gingival side of a bracket body, or a gingival side of a bracket base;

selecting said one or more brackets for receipt in said bonding tray;

engaging said one or more brackets to said bonding tray, said one or more identification marks remaining visually exposed in said bonding tray; wherein said one or more identification marks comprises a first identification mark identifying placement of said bracket on a tooth in an upper dental arch or a tooth in said lower dental arch;

said one or more identification mark comprises a second identification mark, said second identification mark identifying bracket height of said bracket;

said one or more identification mark comprises a third identification mark, said third identification mark identifying bracket height of said bracket; and wherein at least three brackets engage with said bonding tray.

7. A bracket comprising:

a bracket base adapted to attach a tooth of a dental arch, said bracket base having a bracket base surface;

a bracket body extending from said base, said bracket body having a bracket body surface;

a pair of spaced apart tie wings extending from said bracket body, each tie wings of said pair of tie wings having tie wing surface, each of said tie wing surfaces having a margin;

a first identification mark disposed on a gingiva facing bracket surface; and wherein when said bracket resides attached to said tooth of said dental arch, said surface having said identification mark faces towards said gingiva without any other surface of said bracket opposing said identification mark, and without said identification mark opposing itself.

8. A bracket comprising:

a bracket base adapted to attach a tooth of a dental arch, said bracket base having a bracket base surface;

a bracket body extending from said base, said bracket body having a bracket body surface;

a pair of spaced apart tie wings extending from said bracket body, each tie wings of said pair of tie wings having tie wing surface, each of said tie wing surfaces having a margin;

a first identification mark disposed on a gingiva facing bracket surface;

a second identification mark disposed on one of said bracket surface, tie wing surfaces, or bracket base surfaces; and an attached orientation wherein when said bracket resides attached to said tooth of said dental arch, said surfaces having said identification marks face towards gingiva without any other surface of said bracket opposing said identification marks.

\* \* \* \* \*